(12) United States Patent
Deleurme

(10) Patent No.: US 12,071,180 B2
(45) Date of Patent: Aug. 27, 2024

(54) ARTICULATING AIR WALLS FOR USE BETWEEN SEMI-TRUCK AND TRAILER

(71) Applicant: Jesse Peter Deleurme, Kelowna (CA)

(72) Inventor: Jesse Peter Deleurme, Kelowna (CA)

(*) Notice: Subject to any disclaimer, the term of this patent is extended or adjusted under 35 U.S.C. 154(b) by 350 days.

(21) Appl. No.: 17/696,569

(22) Filed: Mar. 16, 2022

(65) Prior Publication Data
US 2022/0297772 A1  Sep. 22, 2022

Related U.S. Application Data

(60) Provisional application No. 63/161,560, filed on Mar. 16, 2021.

(30) Foreign Application Priority Data

Mar. 16, 2021  (CA) ................................ CA 3112076

(51) Int. Cl.
*B62D 35/00*  (2006.01)

(52) U.S. Cl.
CPC ......... *B62D 35/001* (2013.01); *B62D 35/008* (2013.01)

(58) Field of Classification Search
CPC ............................ B62D 35/001; B62D 35/008
See application file for complete search history.

(56) References Cited

U.S. PATENT DOCUMENTS

| | | | | |
|---|---|---|---|---|
| 4,904,015 A * | 2/1990 | Haines | ................. | B62D 35/001 296/180.3 |
| 5,078,448 A * | 1/1992 | Selzer | ................. | B62D 35/001 296/180.2 |
| 5,190,342 A | 3/1993 | Marlowe et al. | | |
| 6,428,084 B1 * | 8/2002 | Liss | ....................... | B62D 53/06 296/180.1 |
| 7,374,229 B1 * | 5/2008 | Noll | ..................... | B62D 25/182 296/180.2 |

(Continued)

FOREIGN PATENT DOCUMENTS

| | | | | |
|---|---|---|---|---|
| DE | 102017113942 A1 * | 12/2018 | ........... | B62D 35/001 |
| WO | WO-2007090172 A2 * | 8/2007 | ......... | B62D 33/0612 |

OTHER PUBLICATIONS

Sharpe, Ben, "Barriers to the adoption of fuel-saving technologies in the trucking sector", The International Council on Clean Transportation, Jul. 2017, pp. 1-16.

(Continued)

*Primary Examiner* — Lori Lyjak
(74) *Attorney, Agent, or Firm* — Antony C. Edwards

(57) ABSTRACT

An apparatus for reducing aerodynamic drag in a gap between a tractor and a trailer comprises a frame assembly and a panel assembly. The frame assembly includes a vertical member extending upwardly from a base, and two arms extending horizontally from the vertical member. The horizontal arms support a cylindrical member which rotates about its longitudinal axis and is biased by a biasing member so as to apply torque to the cylindrical member. The panel assembly is attached to the cylindrical member proximate a leading edge of the panel and includes a wheel offset from a trailing edge of the panel and gliding strips on an inner surface of the panel body. The inner surface of the panel body is in contact with a surface of the trailer proximate the wheel when the tractor is attached to and pulling the trailer.

16 Claims, 5 Drawing Sheets

(56) References Cited

U.S. PATENT DOCUMENTS

| | | | |
|---|---|---|---|
| 8,083,284 B1* | 12/2011 | Logounov | B62D 35/001 |
| | | | 296/180.2 |
| 8,801,077 B2 | 8/2014 | Vogel et al. | |
| 9,493,197 B2 | 11/2016 | Logounov | |
| 10,137,945 B2 | 11/2018 | Burrows et al. | |
| 11,230,329 B1* | 1/2022 | White | B62D 35/007 |
| 11,299,217 B1* | 4/2022 | James | B62D 35/001 |
| 2007/0046067 A1* | 3/2007 | Verona | B62D 35/007 |
| | | | 296/181.6 |
| 2017/0166266 A1 | 6/2017 | Wall, II | |
| 2020/0283077 A1* | 9/2020 | Burrows | B62D 35/001 |
| 2020/0307724 A1* | 10/2020 | Burrows | B62D 35/001 |
| 2021/0070378 A1* | 3/2021 | Duncanson | B62D 35/001 |
| 2021/0139086 A1* | 5/2021 | Andrus | B62D 37/02 |

OTHER PUBLICATIONS

McAuliffe, Brian R., "Improving the aerodynamic efficiency of heavy duty vehicles: wind tunnel test results of trailer-based drag-reduction technologies", Laboratory Technical Report, National Research Council of Canada. Aerospace. Aerodynamics Laboratory, Jul. 22, 2015.
Patten, Jeff et al., Review of Aerodynamic Drag Reduction Devices for Heavy Trucks and Buses, NRC-CNRC Technical Report, National Research Council Canada, May 11, 2012.

* cited by examiner

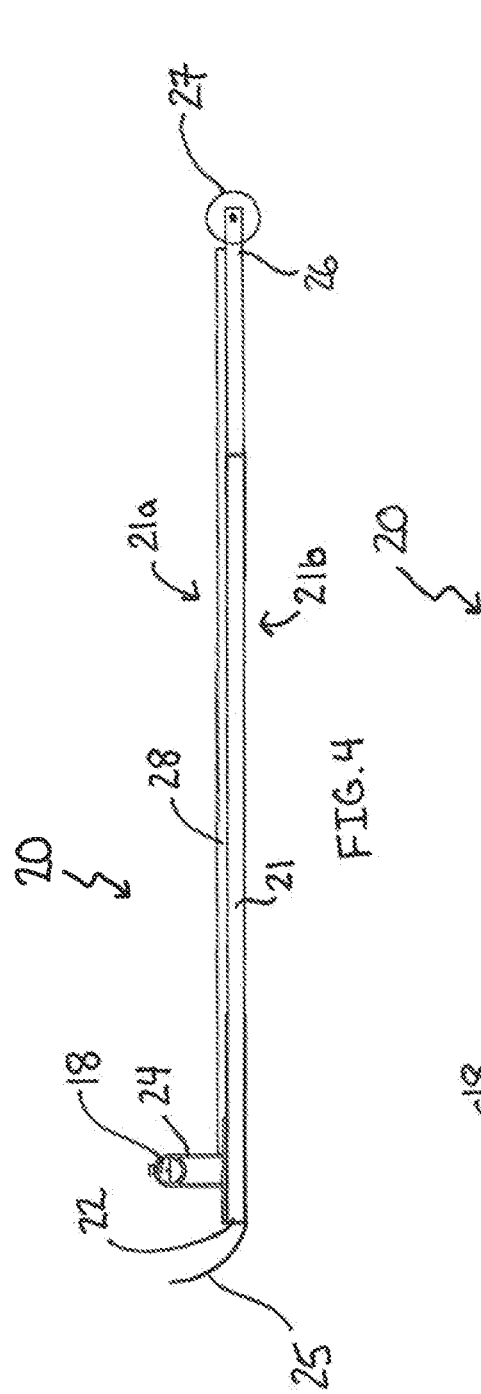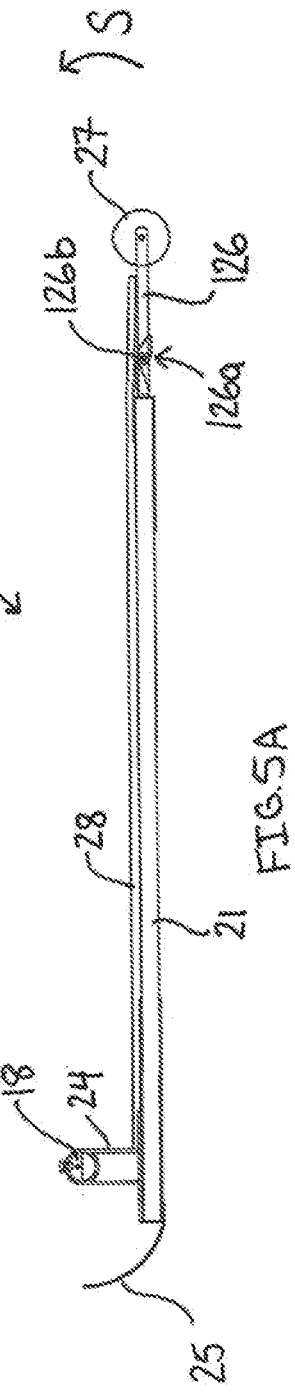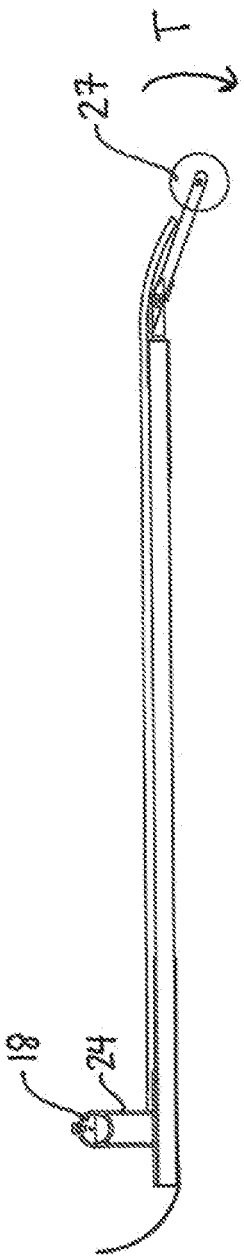

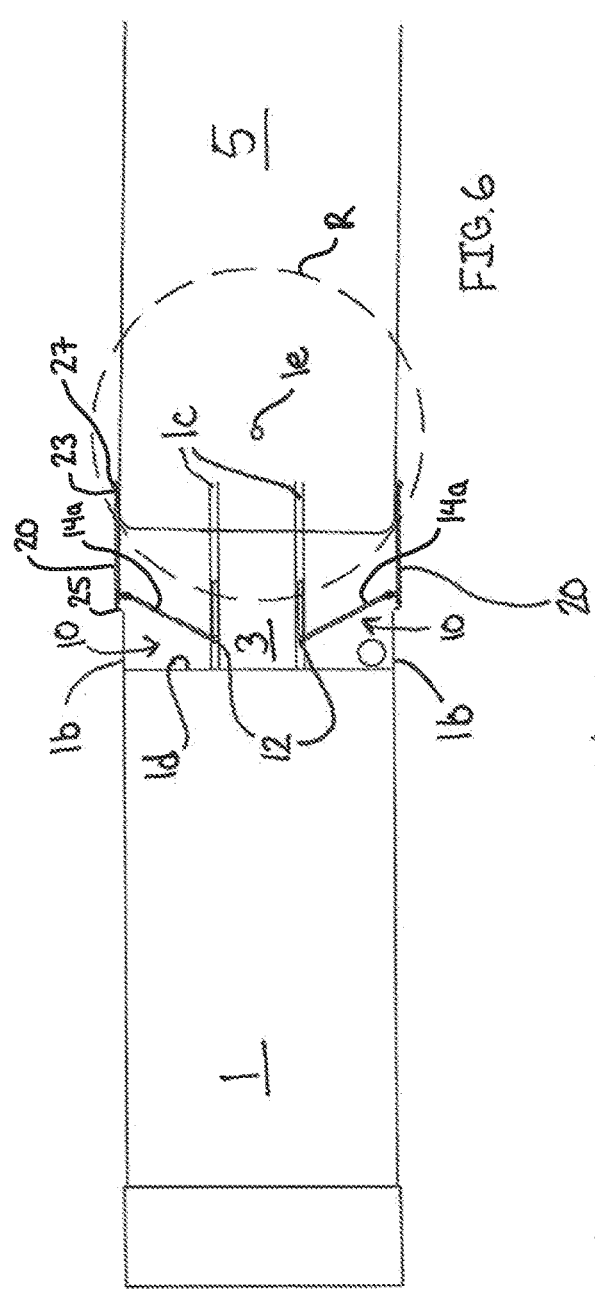
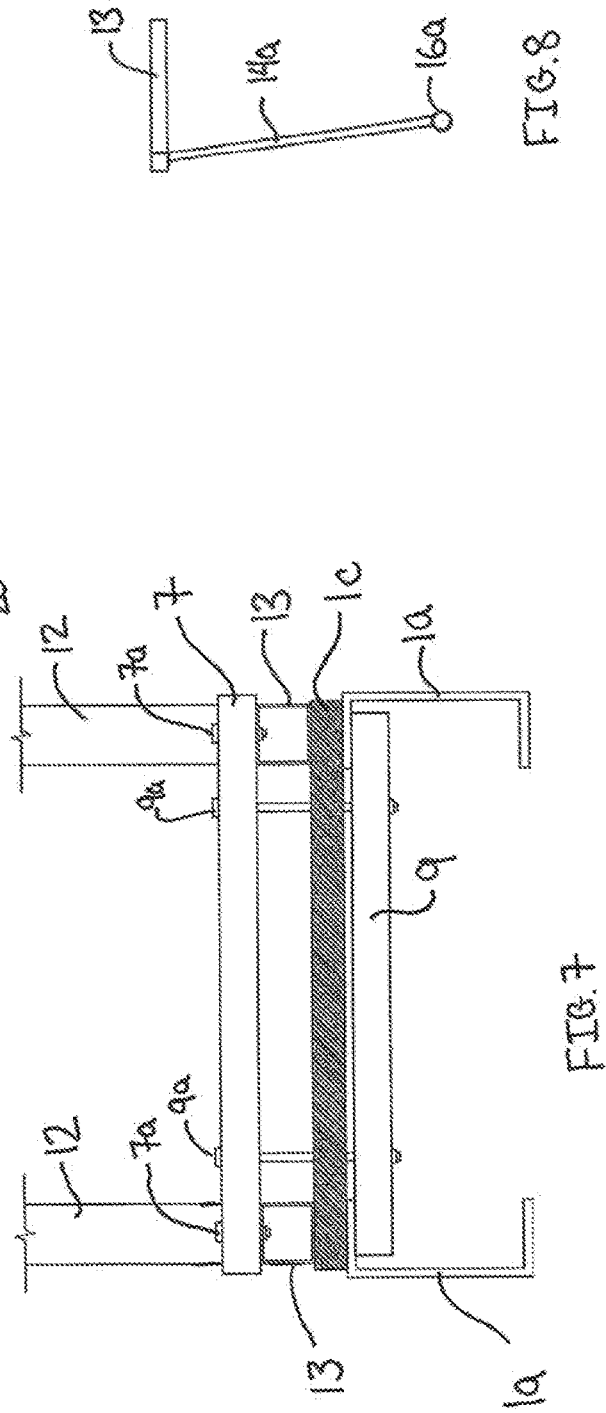

ARTICULATING AIR WALLS FOR USE BETWEEN SEMI-TRUCK AND TRAILER

FIELD

The present disclosure relates to reducing the aerodynamic drag that is caused by air entering the gap between a tractor, such as a semi-truck, and a trailer towed behind the tractor, as the tractor travels at speed. In particular, the present disclosure relates to apparatuses for narrowing, blocking or closing the gap between the tractor and its trailer, so as to reduce or eliminate the air that otherwise enters the gap and increases drag when the tractor is pulling the trailer.

BACKGROUND

In the road transport industry, heavy duty trucks, also known as semi-trucks, are commonly used for hauling one or more trailers filled with cargo, in order to transport those goods from one location to another. Road transport is heavily relied upon for the timely and reliable transportation of goods over land. A major cost input for road transport is the cost of fuel for the trucks (otherwise referred to herein as "tractors"). Because a given truck may travel tens or hundreds of thousands of kilometers in the course of one year, it is desirable to identify low-cost and efficient devices or methods for reducing overall fuel consumption on the truck, thereby reducing the cost of transporting the goods. In particular, it is desirable that solutions for reducing fuel consumption and increasing fuel efficiency be capable of retrofitting onto existing trucks, as such trucks represent a significant investment and may be operated for several years before requiring replacement.

One known factor that decreases fuel efficiency in transport trucks is the effect of aerodynamic drag that is caused by air entering the gap that exists between the truck and its trailer. Such a gap is necessary for the operation of the truck's fifth wheel, which enables the trailer to pivot relative to the truck when the truck turns, thereby allowing clearance between the truck and trailer during the pivot. However, when the truck and trailer are travelling at highway speeds, turbulent airflow within the gap between the truck and trailer produces a significant drag force. Additionally, crosswinds passing through the gap when the tractor-trailer combination is travelling at lower speeds, and crosswinds passing through the gap during turning maneuvers, which are performed by the tractor-trailer combination at lower speeds, are also known to produce significant aerodynamic drag at speeds that are significantly lower than highway speeds.

To the Applicant's knowledge, previous attempts at closing the gap between the truck and trailer include an expandable and retractable aerodynamic fairing assembly that utilizes inflatable panels, as described in US Publication No. 2017/0166266 by applicant Wall Global LLC. The apparatus uses inflatable wall panels that automatically deploy and retract at certain speeds, so that the inflatable wall panels, which are used as aerodynamic fairings, are only deployed when the truck is travelling above certain speeds. An electronic controller actuates a blower/vacuum unit, wherein the blower is used to inflate the inflatable panels so that they expand out of a housing when the truck reaches a pre-determined speed, and the vacuum is used to deflate the inflatable panels and retract the panels into the housing using cables on reels when the truck slows to a pre-determined speed. The inflatable panels include magnets at a distal edge of the panel for securing the panels to the surface of the trailer.

Other prior art, of which the Applicant is aware, includes U.S. Pat. No. 10,137,945 to applicant Xstream Trucking Inc, which discloses a deployable fairing system comprising deployable upper and/or lower horizontal assemblies that are pivotally coupled to a frame attached to the tractor cab, and two side panels that are pivotally coupled to one or both of the upper and lower horizontal assemblies. The upper and lower horizontal assemblies and the two side panels fold in on one another along multiple hinged axes in the unextended configuration. A controller deploys the fairing system when the truck is travelling above a pre-determined speed and retracts the fairing system when the truck is travelling below a pre-determined speed, so as to provide the clearance required between the truck and the trailer when the truck is making a turn.

In addition to the active deployable fairing systems described above, Applicant is also aware of a passive fairing system described in International Patent Publication No. WO 2014/022058 by applicant Praxair Technology Inc. This document discloses a fairing mounted to the chassis of the truck behind the truck cab, the fairing comprising upper and side panels mounted to a rigid frame. This fairing system additionally requires a seal element for sealing the gap formed between the cab and the fairing, which may comprise rigid and resilient elements, or only resilient elements, that are riveted or adhered to the cab.

Another passive fairing system, of which Applicant is aware, is described in U.S. Pat. No. 9,493,197 to Logounov. A wind fairing panel assembly includes two hinged side panels and one hinged top panel that mount to the cab of a truck tractor via a cab collar adaptor, which is an arch-shaped support that is adapted to fit against the contoured rear surface of the cab. The hinged side and top panels mount to the cab collar adaptor. The trailing edges of the panels are fitted with inward directed wind seals, and rows of ball bearing pucks are arranged in the crowns of the inward directed wind seals to reduce friction and wear as the fairing panels swing to accommodate the twisting and turning of the utility trailer.

SUMMARY

In one aspect of the present disclosure, a simplified apparatus for providing articulating air walls that close the lateral gap between the tractor and trailer is provided. The apparatus utilizes a minimal frame assembly, consisting of a vertical member extending upwardly from a base, and a pair of arms extending horizontally from the vertical member. The pair of arms support a panel attachment mechanism, which supports a preferably lightweight panel assembly that is positioned so as to cover the lateral gap between the truck and the trailer. Advantageously, this minimal frame assembly for supporting the panel assembly enables ease of installation of the apparatus onto a truck so as to retrofit the truck, as the minimal frame structure is less likely to interfere with other equipment that may exist in the gap, including but not limited to heating and refrigeration units, headache racks, hydraulic lines, exhaust stacks, and other truck equipment or peripheral equipment that may be installed in, or stored in, the gap.

Furthermore, the minimal support structure is not attached to the rear surface of the cab, but instead is mounted to the lower horizontal frame, sometimes referred to as the C-channel, of the truck, using fasteners such as bolts, u-bolts, screws, mounting clamps and the like. Advantageously, this enables installation of the apparatus onto a truck without having to damage or permanently alter the rear outer surface of the truck's cab, which is attractive from a retrofitting standpoint, as damage to a cab's surface caused by drilling holes into the cab may be difficult and expensive to repair, for example in situations where it is desired to later remove the apparatus from the truck or where an error is made when drilling holes in the cab for installation of a fairing device.

Additionally, the minimal structure of the frame assembly enhances the universality of the apparatus, as there is no need to create a customized portion of the apparatus in order to fit against the contours of the rear cab surface of a particular truck, as is required in some prior art examples of aerodynamic fairing systems. In some embodiments, the frame assembly may be modified so as to further enhance the universality of the frame assembly of the apparatus, to include vertical members and/or horizontal arms that have adjustable lengths, for example by providing telescoping vertical members or telescoping arms with stops to adjust each portion to a desired height or length, so that the height of the vertical members and/or the length of the horizontal arms may be adjusted to fit the dimensions of different trucks. Other length adjustment mechanisms may include outer sleeve pieces for the vertical member and/or the horizontal arms that slide over a corresponding primary vertical member and/or horizontal arm, and including a stop or a collar piece for securing the sleeve at the desired adjusted length. In some embodiments, the vertical member may comprise two portions, the first portion having an outer thread and the second portion having a corresponding inner thread, so that the length of the vertical member is adjustable by rotating the second portion relative to the first portion and including a stopping mechanism for securing the two portions once the desired adjusted length of the vertical member has been achieved. Other arrangements enabling the adjustment of the lengths of the horizontal arms and vertical members as would be known to a person skilled in the art are included in the scope of the present disclosure.

In some embodiments, the angle between the vertical member and each horizontal arm may be adjustable, to further enable adjustments of the frame assembly during installation of the assembly onto a truck. The panel body of the panel assemblies may be manufactured to have a range of dimensions. Thereby, longer or shorter panels may be made available to account for differences in the size of the gap of different tractor-trailer configurations, so that an appropriate size of panel may be selected to ensure the trailing end of the panel is in contact with the side of the trailer when the apparatus is installed on the tractor and the tractor and trailer are coaxially aligned.

A further advantage, in some embodiments of the present disclosure, is that the configuration of the frame assembly (otherwise referred to herein as the support structure) enables the apparatus to be always in place when the tractor is travelling, including when the tractor is travelling in a straight line or completing sharp turns at slow speeds, as the support structure is configured so as to not interfere with the turning radius of the trailer relative to the frame of the truck. Thus, disclosed herein is a passive apparatus that does not need to be retracted and extended at different truck travel speeds, as compared to some of the prior art fairing systems that are actively controlled to retract the fairing system at lower speeds so as to provide sufficient clearance for the trailer during turning maneuvers.

In some embodiments, the Applicant has found that using one or more wheels, offset from the trailing edge of the panel, in combination with glide strips mounted on an inner surface of the panel, enables the panel to slide along the slides of the trailer while the tractor is in motion, thereby maintaining contact with the trailer and keeping the gap closed during travel at different speeds. Furthermore, the offset wheel or wheels assist with re-positioning a panel assembly from a front surface to the side surfaces of a trailer, when a turn has resulted in the panel falling into the gap, as the offset wheel engages and then travels along the surface of the trailer as the truck straightens out after a turning maneuver.

In one aspect of the present disclosure, an apparatus for reducing aerodynamic drag in a gap between a tractor and a corresponding trailer attached to the tractor comprises a frame assembly and a panel assembly. The frame assembly comprises a base, a vertical member extending upwardly from the base and upper and lower arms extending horizontally from the vertical member, the upper and lower arms each having a proximal end attached to the vertical member and an opposite distal end, the distal end of each arm supporting a bearing, an elongate cylindrical member journaled through the bearing so that the cylindrical member is rotatable about a longitudinal axis of the cylindrical member, and a biasing member applying torque to the cylindrical member to bias the cylindrical member in a rotational direction towards the gap between the tractor and trailer. The panel assembly is attached to the frame assembly, the panel assembly comprising a panel body having a leading edge, a trailing edge opposite the leading edge, an inner surface and an outer surface opposite the inner surface. Upper and lower brackets are mounted to the inner surface of the panel body proximate the leading edge of the panel body, and a wheel is supported on a wheel bracket, the wheel bracket mounted to the panel body proximate the trailing edge such that an axis of rotation of the wheel is parallel to the trailing edge of the panel body and offset apart from the trailing edge of the panel body. Opposite upper and lower portions of the cylindrical member are secured in the upper and lower brackets of the panel assembly. The inner surface of the panel body is in contact with a surface of the trailer proximate the wheel when the tractor is attached to and pulling the trailer. When a longitudinal axis of the trailer is greater than 0° relative to a longitudinal axis of the tractor, the inner surface of the panel body slides along a side surface of the trailer. When the trailing edge of the panel assembly falls into a gap between the trailer and the tractor, the wheel contacts and travels along a front surface of the trailer and over an edge of the trailer as the trailer and the tractor become re-aligned such that an angle between the longitudinal axes of the trailer and of the tractor approaches 0°.

BRIEF DESCRIPTION OF THE DRAWINGS

FIG. 4 is a top plan view of an embodiment of the panel assembly of the apparatus.

FIG. 5A is a top plan view of an embodiment of the panel assembly of the apparatus, with the spring loaded hinge in a neutral position.

FIG. 5B is a top plan view of the embodiment of the panel assembly shown in FIG. 5A, with the spring loaded hinge in an extended position.

FIG. 6 is a schematic top plan view of the apparatus mounted to a truck towing a trailer.

FIG. 7 is a front sectional view of a portion of an embodiment of the frame assembly mounted to the truck frame.

FIG. 8 is a schematic top plan view of an embodiment of the frame assembly.

DETAILED DESCRIPTION

In different embodiments of the present disclosure, the apparatus comprises a panel assembly mounted to a frame assembly, the frame assembly being mountable to a horizontal frame, such as a C-channel, of the truck. Typically, the apparatus includes left and right hand frame and panel assemblies, although it will be appreciated that the left and right hand frame assemblies may be attached to each other or otherwise supported by a single frame piece extending between the bases of the left and right hand frame assemblies, or alternatively, that the left and right hand frame assemblies may extend from a single base supporting two vertical members. Each of these embodiments or variations share in common a single vertical member supporting a single panel assembly, with two arms extending from the vertical member to support the panel assembly, as will be further described below.

Figure 1:
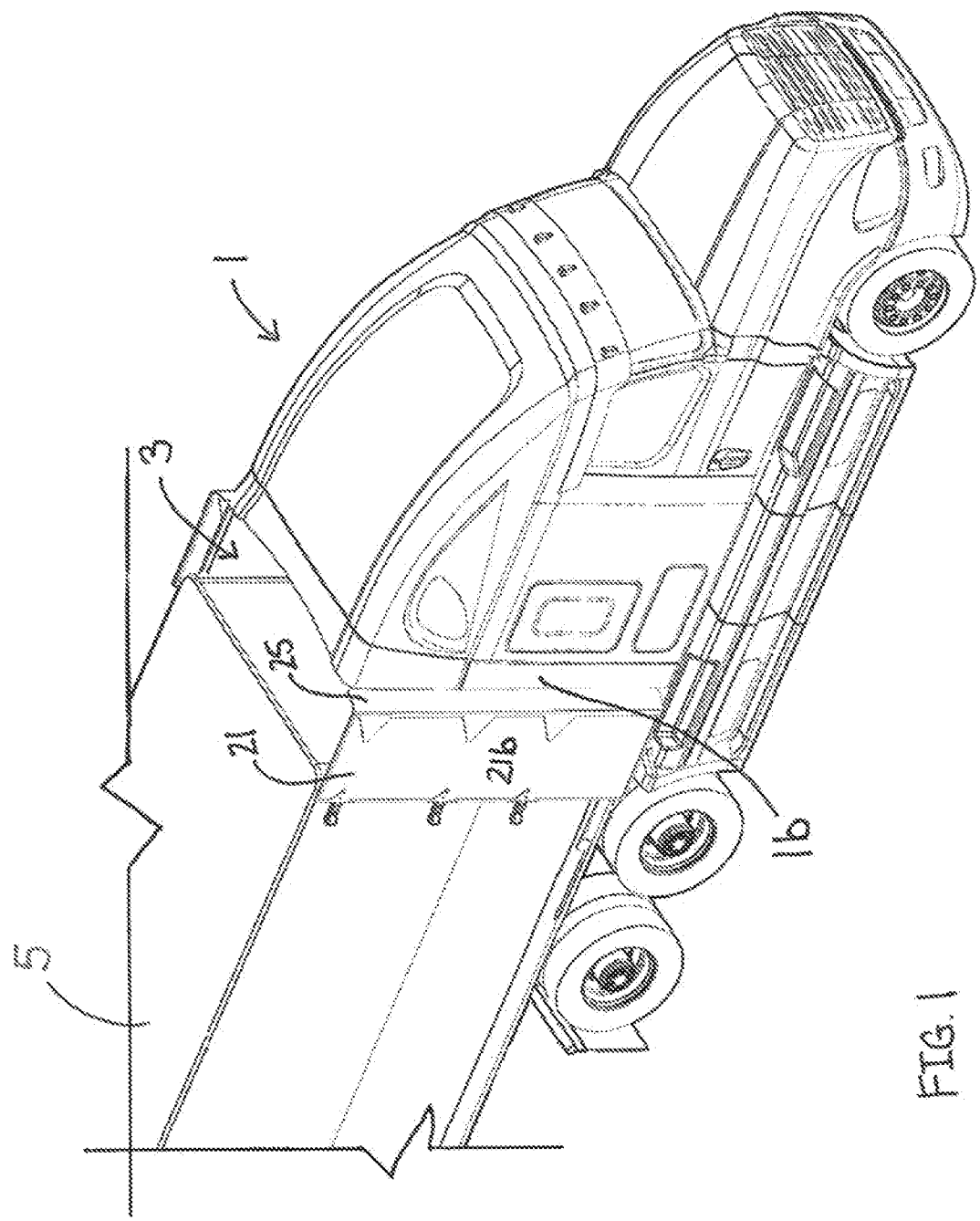
FIG. 1 is a perspective view of an embodiment of the apparatus of the present disclosure mounted to a truck, the truck hauling a trailer.
Figure 3:
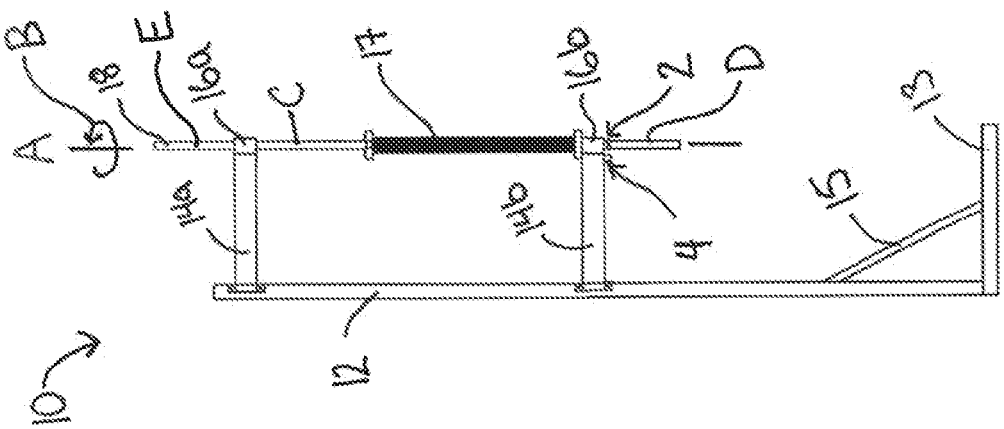
FIG. 3 is a side elevation view of an embodiment of the frame assembly of the apparatus.
Figure 2B:
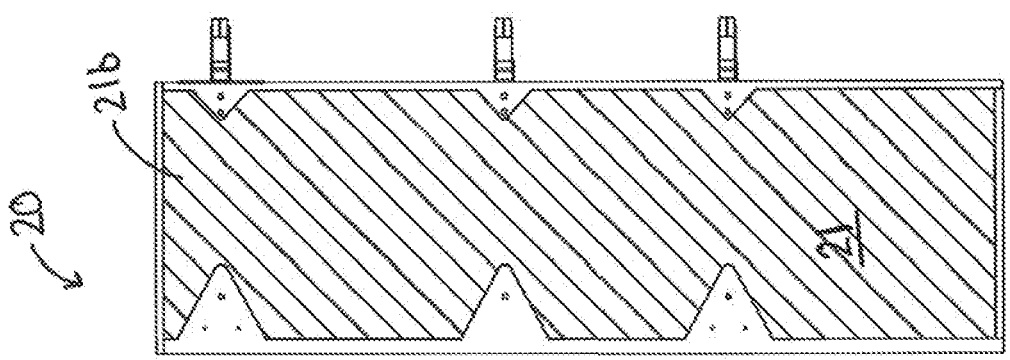
FIG. 2B is a front elevation view of an embodiment of a right hand panel assembly of the apparatus.
Figure 2A:
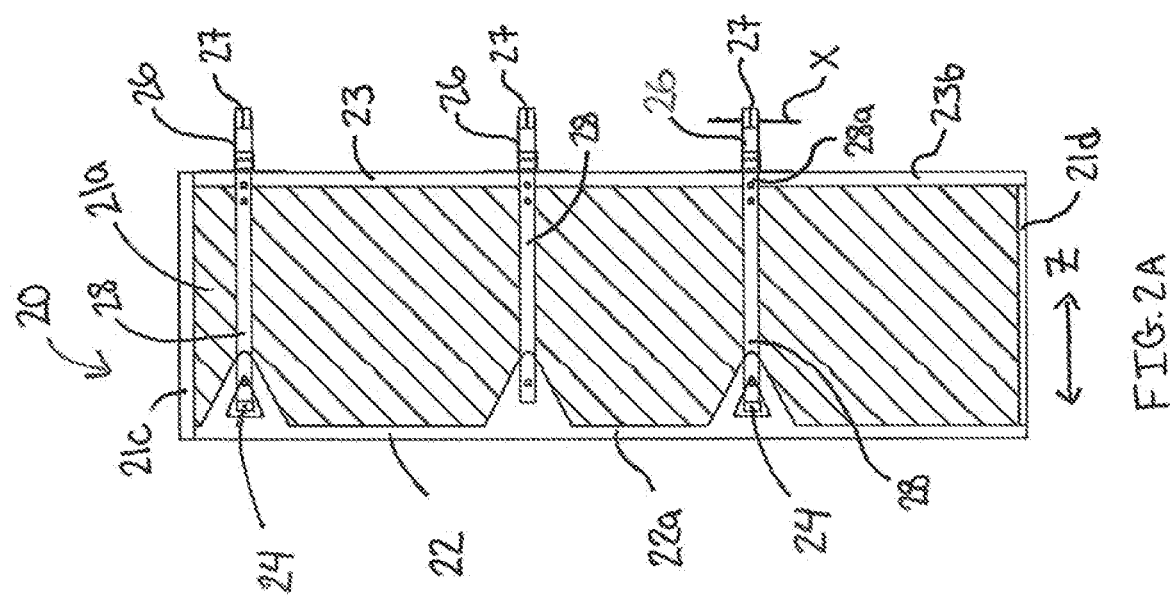
FIG. 2A is a rear elevation view of an embodiment of a left hand panel assembly of an embodiment of the apparatus.

An embodiment of the frame assembly is described with reference to FIGS. 3, 7 and 8. As shown in FIG. 3, a frame assembly 10 comprises a vertical member 12, and a pair of upper and lower arms 14a, 14b which extend in a horizontal direction from the vertical member 12 and at an acute angle relative to the rear surface 1d of the truck cab, as shown for example in FIG. 9A. The arms 14a, 14b each have a proximal end that is attached to the vertical member 12, and an opposite distal end which supports a bearing; in some embodiments, a collar 16a, 16b is attached to the distal end of each arm 14a, 14b. A bearing is fitted into each collar 16a, 16b, and a cylindrical member 18 is journaled through the bearings mounted inside the collars 16a, 16b. The frame further includes a base 13, the base 13 supporting a lower end of the vertical member 12. In some embodiments, the frame assembly 10 may further include a bracing member 15 which extends from the base 13 to the vertical member 12, to provide extra support for the weight of the panel assembly supported by the frame assembly 10. In a preferred embodiment, each of the frame components 12, 14a, 14b, 13 and 15 are constructed of hollow frame members, each frame member having any cross-sectional geometry, including but not limited to square, circular or triangular cross-sections, and are constructed of strong, durable materials, such as but not limited to steel. However, it will be appreciated that some or all of these frame components may be constructed of solid frame members and are included in the scope of the present disclosure.

The cylindrical member 18, which may or may not be hollow, is journaled through the bearings within the collars 16a, 16b attached to the distal ends of the arms 14a, 14b, located distally from the vertical member 12 of the frame assembly. The cylindrical member 18 freely rotates within the bearings about its vertical axis of rotation A. Between the upper and lower arms 14a, 14b there is a biasing member 17, for example a torsion spring supported on the cylindrical member 18. The biasing member 17 applies torque to the cylindrical member and the attached panel assembly when the panel assembly is attached to the cylindrical member 18, so as to bias the panel in rotational direction B, as will be further described below. Other examples of biasing members include, but are not limited to, spring-loaded pivot hinges.

In some embodiments, the frame assembly 10 may preferably include a stop mechanism, so that the torque applied to the cylindrical member 18 is limited to reduce or prevent the panel assembly from unnecessarily swinging into the gap 3 between the tractor 1 and the trailer 5, and to otherwise assist with maintaining the panel assembly in alignment with the sides of the trailer 5. In one example, as shown in FIG. 3, a stop mechanism may include a stop collar 2 and a stop tab 4. The stop tab 4 may be attached to, for example, the lower arm 14b proximate the cylindrical member 18. The stop collar 2, which for example may be a quick connect shaft collar, is modified so as to have a protrusion protruding in a perpendicular direction relative to the rotational axis A of cylindrical member 18. When the stop collar 2 is installed on a lower end of the cylindrical member 18 and horizontally aligned with the stop tab 4, and the cylindrical member 18 along with the stop collar 2 rotate in direction B, the protrusion on the stop collar 2 will push against the stop tab 4, thereby preventing further rotation of the cylindrical member 18 and the attached panel assembly in direction B. Advantageously, the use of a quick connect shaft collar as the stop collar enables tool free adjustments of the stop position of the cylindrical member 18, by simply loosening the quick connect shaft collar and rotating the protrusion to a desired position before re-tightening the collar onto the cylindrical member 18; however, it will be appreciated that other stop mechanisms may be employed and are intended to be included within the scope of the present disclosure.

The simple frame assembly 10 advantageously enables ease of installation of the apparatus onto a tractor. For example, with reference to FIG. 7, the frame of the truck 1 includes a pair of horizontal, elongated beams, for example the C-channels 1a, which support a horizontal walking grate 1c located behind the cab of the truck. The pair of C-channels 1a extend from the front to the rear of the truck 1. An example of a method for installing the apparatus to the truck, not intending to be limiting, includes mounting a steel bar or plate 7 to each of the horizontal frame members 13 of a pair of frame assemblies 10, using bolts 7a, and then securing the assembly to the C-channel frame 1a by clamping a second steel bar or plate 9, the positioned beneath a portion of the C-channels 1a, with bolts 9a, wherein the bolts 9a pass through the first and second steel plates or bars 7, 9 and through holes or spaces in the walking grate 1c. It will be appreciated by a person skilled in the art that the example for mounting the frame assemblies 10 to a frame 1a of the truck 1, as illustrated in FIG. 7, is intended as an illustrative example of how the frame assemblies may be mounted to the frame assembly of the truck 1, and that other methods for mounting the frame assemblies 10 to the frame of the truck are included in the scope of the present disclosure. It will also be appreciated that, although the horizontal frame members in the example of a truck shown in FIG. 7 are comprised of C-channel beams, that other shapes of beams may be used in the construction of the frame of a truck, and that the illustrated example shown in FIG. 7 is not intended to be limiting.

Now the panel assembly 20 will be described, with reference to FIGS. 1, 2A, 2B, 4, 5A and 5B. The panel assembly 20 is preferably constructed of strong and lightweight materials, and for example may include a panel body 21 constructed of polycarbonate; however, other strong and lightweight materials that would be suitable for the panel body 21, as would be known to a person skilled in the art, may be used in manufacturing the panel body 21 and are included in the scope of the present disclosure. The panel body includes an inner surface 21a and an outer surface 21b, whereby when the apparatus is mounted to a truck 1, the outer surface 21b of the panel assembly 20 faces outwardly and away from the gap 3, and the inner surface 21a of the panel assembly 20 faces inwardly towards the gap 3. The panel assembly 20 comprises a leading edge 22, a trailing edge 23, and two or more brackets 24. The brackets 24 are mounted to the inner surface 21a of the panel body 21, proximate the leading edge 22 of the panel assembly 20. As best viewed in FIGS. 4 to 5B, the brackets 24 are attached to the cylindrical member 18, with the brackets 24 secured to the cylindrical member 18 at points above and below the torsion spring 17. For example, not intending to be limiting, the brackets 24 may be secured to the cylindrical member 18 at points C and D of the cylindrical member 18, or alternatively at points D and E of the cylindrical member 18 as shown in FIG. 3.

The panel assembly 20 further includes one or more wheel brackets 26, each wheel bracket 26 rotatably supporting a wheel 27. The wheel 27 is mounted to the wheel bracket 26 such that wheel's axis of rotation X is offset apart from and substantially parallel to the trailing edge 23 of the panel assembly 20. In some embodiments, the panel assembly 20 further includes one or more elongate gliding strips 28. The gliding strips 28 are mounted to the inner surface 21a of the panel body 21, such that the gliding strips 28 extend from a bracket 24 to the wheel bracket 26. The gliding strips 28 may be manufactured of a material having a low friction coefficient and are preferably manufactured of a material that will resist wear and tear. The gliding strips 28 come into contact with the surfaces of the trailer 5, and glide against the surfaces of the trailer 5 in direction Z as the truck 1 turns relative to the trailer 5, for example during a turning maneuver or otherwise during travel. An example of the material that the gliding strips 28 may be manufactured of, without intending to be limiting, includes ultra high molecular weight (UHMW) plastics, such as UHMW polyethylene; however, it will be appreciated that other materials may be suitable as would be understood by a person skilled in the art, and are intended to be included in the scope of the present disclosure. In some embodiments, the wheel end 28a of the gliding strip 28 may be beveled so as to further facilitate the passage of the gliding strips over bolts or other protrusions on the surface of the trailer 5. In other embodiments, some or all of the edges of the gliding strips may be beveled.

In some embodiments of the present disclosure, the leading edge 22 of the panel assembly 20 may further include a rounded extension 25, the rounded extension 25 extending away from the leading edge 22 and towards the front of the truck 1. As best viewed in FIG. 1, the rounded extension 25 may provide a continuous rounded surface between the side fairing 1b of the truck 1 and the panel body 21, so as to further improve the aerodynamic profile of the transition between the truck 1 and the trailer 5. The rounded extension 25 may also be manufactured of a lightweight and strong material, including but not limited to aluminum. In some embodiments, the leading and trailing edges 22, 23 of the panel assembly 20 may be wrapped in aluminum edging 22a, 23b so as to improve the strength and durability of the panel assembly 20. Additionally, the upper and lower edges 21c, 21d of the panel assembly 20 may also be wrapped in aluminum edging. In some embodiments, the trailing edge 23 of the panel assembly may be wrapped in a low-friction coefficient material, such as the same material that the gliding strips are manufactured of, which in some embodiments may include UHMW polyethylene.

Referring to FIGS. 4, 5A-5B, 6, 7, and FIGS. 9A to 9D, the operation of the apparatus will now be described. As best viewed in FIG. 6, a schematic diagram showing a truck 1 mounted to a trailer 5 illustrates the pair of frame assemblies 10 mounted to the respective C-channels 1a of the truck. The arms 14a, 14b support a panel assembly 20 so as to cover the lateral entrances to the gap 3 between the truck 1 and the trailer 5. As will also be noted in FIG. 6, the frame assemblies 10 are mounted such that the vertical member 12 of each frame assembly 10 is mounted spaced apart from the rear surface 1d of the truck's cab, and the swing radius R of the trailer 5 does not come into contact with the vertical members 12 of each frame assembly 10. As also viewed in FIG. 6, a rounded extension 25 of each panel assembly 20 is in close proximity to the truck's side fairing 1b, and the trailing edge 23 of the panel assembly 20 is in contact with a surface of the trailer 5. Thereby, as may be viewed in FIG. 6, when the apparatus is installed on the truck 1, the panel assembly 20 covers the lateral gap 3 on each side of the gap.

Figure 9D:
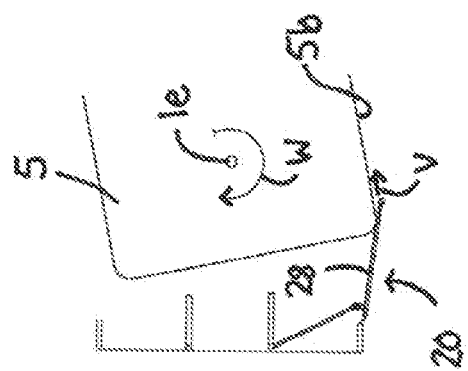
FIGS. 9A to 9D is a series of schematic top plan views of an embodiment of the apparatus mounted to a truck, illustrating the positioning of the apparatus relative to the trailer as the trailer pivots relative to the truck.
Figure 9C:
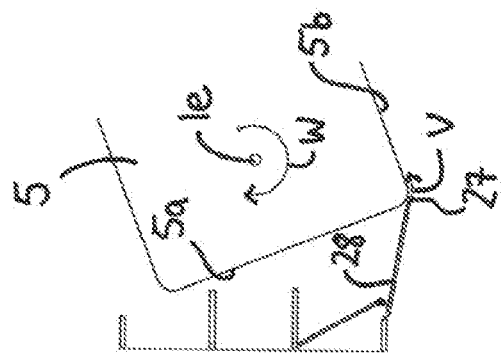
Figure 9B:
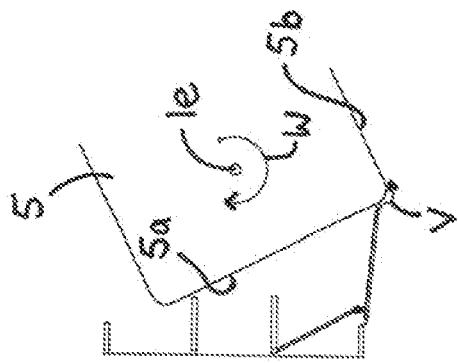
Figure 9A:
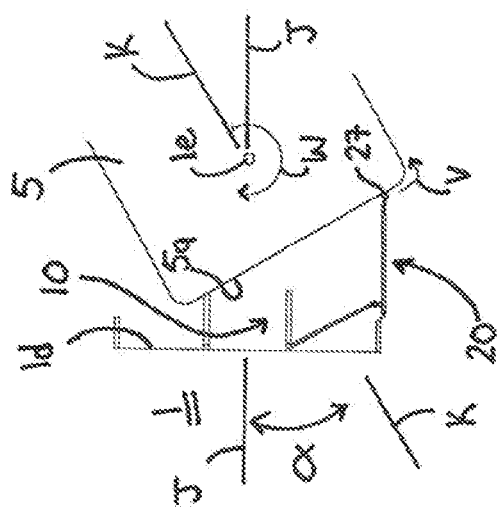

FIGS. 9A to 9D are schematic drawings that illustrate the movement of a panel assembly 20 relative to the surfaces of the trailer 5, in a situation where the panel assembly 20 has become positioned in between the truck 1 and the trailer 5 during a turn manoeuvre by the truck. For clarity, in the schematic drawings of FIGS. 9A to 9D, only the left-hand frame and panel assemblies are shown. As shown in FIG. 9A, a truck has completed a turn, such that the angle α between a longitudinal axis J of the truck 1 and a longitudinal axis K of the trailer 5 is greater than 0° and is now straightening out to pivot the trailer 5 about the fifth wheel's pivot point 1e in direction W to decrease angle α between the longitudinal axes J, K of the truck and the trailer until angle α is zero, at which point the longitudinal axes J, K are coaxially aligned.

In FIG. 9A, the wheel 27 of the panel assembly 20 is in contact with a front surface 5a of the trailer 5 and is travelling along the front surface 5a of the trailer in direction V. As shown in FIG. 9B, as the trailer 5 continues to rotate in direction W about pivot point 1e, the wheel 27 continues to travel in direction V along the front surface 5a of the trailer and towards a side surface 5b. As the trailer 5 continues pivoting about pivot point 1e in direction W, the wheel 27 encounters a corner of the trailer between the front and side surfaces 5a, 5b of the trailer, as illustrated in FIG. 5C. Finally, as shown in FIG. 9D, as the trailer approaches alignment with the truck 1, the corner of the trailer between the front and side surfaces 5a, 5b comes into contact with a gliding strip 28 of the panel assembly 20, thereby enabling the corner of the trailer 5 to continue gliding along the gliding strip as the trailer completes the turn.

In some embodiments of the panel assembly 20, as illustrated in FIGS. 5A and 5B, the wheel bracket may be a spring-loaded hinge bracket 126. The spring-loaded hinge bracket 126 includes a hinge 126a, the hinge 126a torqued by a spring 126b, whereby the spring biases the hinge in direction S. When the panel assembly 20 becomes positioned in the gap 3 between the truck 1 and the trailer 5, as shown in FIGS. 9A and 9B for example, the optional spring-loaded hinge bracket 126 enables a hinge to bend in direction T, thereby allowing the panel assembly 20 to move along the front surface 5a of the trailer with less friction. When the panel assembly 20 once again becomes positioned along the side surface of the trailer, the spring 126b biases the wheel 27 in direction S to once again align the spring-loaded hinge bracket 126 with the body 21 of the panel assembly 20. Advantageously, this enables the wheel 27 to be maintained in close proximity to the trailer 5 when the wheel 27 is proximate side service 5b of the trailer, which assists in maintaining the apparatus in compliance with department of transport regulations, which often set limits of how far away from the main body of the trailer a trailer accessory may extend; for example, the United States Department of Transportation regulations the require any accessories on a trailer to extend no more than three inches from the side of the trailer, and similarly, Transport Canada regulations require such accessories to extend no further than 10 cm from the side surface of the trailer.

As used herein, it is appreciated that the term "vertical" means substantially perpendicular relative to a ground beneath the vertical element and includes, for example, elements that are at an angle in the range between 85° and 95° relative to the ground. In some embodiments, the term "vertical" refers to substantially perpendicular to the ground and includes, for example, elements that are at an angle in the range of between 65° and 115° relative to the ground. The term "horizontal", as used herein, means substantially parallel relative to a ground beneath the horizontal element, and includes, for example, elements that are at an angle in the range of 0° to 5° relative to the ground. In some embodiments, the term "horizontal" refers to substantially parallel to the ground and includes, for example, elements that are at an angle in the range of 0° to 25° relative to the ground. In some embodiments, when a vertical element and a horizontal element, as described herein, are attached to one another, the angle formed between the vertical and horizontal elements may be approximately 90°, plus or minus approximately 25°.

What is claimed is:

1. An apparatus for reducing aerodynamic drag in a gap between a tractor and a corresponding trailer attached to the tractor, the tractor comprising a tractor frame, the apparatus comprising:
    a frame assembly comprising a base, a vertical member extending upwardly from the base and upper and lower arms extending horizontally from the vertical member, the upper and lower arms each having a proximal end attached to the vertical member and an opposite distal end, the distal end of each arm supporting a bearing, an elongate cylindrical member journaled through the bearing so that the cylindrical member is rotatable about a longitudinal axis of the cylindrical member, and a biasing member applying torque to the cylindrical member to bias the cylindrical member in a rotational direction towards the gap between the tractor and trailer;
    a panel assembly comprising a panel body having a leading edge, a trailing edge opposite the leading edge, an inner surface and an outer surface opposite the inner surface, wherein upper and lower brackets are mounted to the inner surface of the panel body proximate the leading edge of the panel body, and a wheel supported on a wheel bracket, the wheel bracket mounted to the panel body proximate the trailing edge such that an axis of rotation of the wheel is parallel to the trailing edge of the panel body and offset apart from the trailing edge of the panel body;
    wherein opposite upper and lower portions of the cylindrical member of the frame assembly are secured in the upper and lower brackets of the panel assembly; and
    wherein the inner surface of the panel body is in contact with a surface of the trailer proximate the wheel when the tractor is attached to and pulling the trailer; and
    wherein, when a longitudinal axis of the trailer is greater than 0° relative to a longitudinal axis of the tractor, the inner surface of the panel body slides along a side surface of the trailer; and
    wherein, when the trailing edge of the panel assembly falls into a gap between the trailer and the tractor, the wheel contacts and travels along a front surface of the trailer and over an edge of the trailer as the trailer and the tractor become re-aligned such that an angle between the longitudinal axes of the trailer and of the tractor approaches 0°.

2. The apparatus of claim 1, wherein the frame assembly is mountable to the tractor frame of the tractor using one or more mounting members.

3. The apparatus of claim 2, wherein the one or more mounting members are selected from a group consisting of: bolts, U-bolts, mounting clamps, screws.

4. The apparatus of claim 1, wherein the panel body is manufactured of polycarbonate.

5. The apparatus of claim 4, wherein the leading and trailing edges of the panel body are each wrapped in an edging.

6. The apparatus of claim 5, wherein the leading edge further includes a rounded aluminum extension, the rounded aluminum extension protruding from the leading edge in the plane of the panel body so as to provide a rounded face proximate to the leading edge of the panel body.

7. The apparatus of claim 1, wherein the panel assembly further comprises an elongate gliding strip mounted to the inner surface of the panel body, the gliding strip having a leading end and a trailing end, the leading end located proximate the leading edge of the panel and the trailing end located proximate the trailing edge of the panel and proximate the corresponding wheel.

8. The apparatus of claim 7, wherein the wheel includes at least two wheels and wherein the gliding strip includes at least two gliding strips, wherein each gliding strip is mounted to the inner surface of the panel body and proximate to a corresponding wheel of the at least two wheels.

9. The apparatus of claim 7, wherein at least one end of the gliding strip is beveled so as to facilitate the gliding strip gliding over protrusions that protrude from the surface of the trailer.

10. The apparatus of claim 9, wherein the edges of the gliding strip are beveled so as to facilitate the gliding strip gliding over protrusions that protrude from the surface of the trailer.

11. The apparatus of claim 7, wherein the gliding strip is manufactured of a wear-resistant material, the wear-resistant material having a low friction coefficient.

12. The apparatus of claim 1, wherein the wheel bracket includes a spring loaded hinge, the spring loaded hinge configured to bias the wheel towards the trailer when the apparatus is mounted to the tractor and the tractor is pulling the trailer; and wherein the wheel bracket rotates about the hinge so as to move the wheel away from the trailer when the panel enters the gap between the tractor and the trailer and the wheel contacts the front surface of the trailer.

13. The apparatus of claim 1, wherein the frame assembly further includes a stop mechanism for limiting a range of motion of the cylindrical member in the said rotational direction.

14. The apparatus of claim 1, wherein the biasing member is a torsion spring.

15. The apparatus of claim 1, wherein a height of the vertical member is selectively adjustable.

16. The apparatus of claim 1, wherein a length of each of the upper and lower arms is selectively adjustable.

\* \* \* \* \*